US006956949B1

(12) United States Patent  
Faber et al.

(10) Patent No.: US 6,956,949 B1
(45) Date of Patent: Oct. 18, 2005

(54) METHOD AND APPARATUS FOR AUTHENTICATING AN HIERARCHY OF VIDEO RECEIVING DEVICES

(75) Inventors: Robert W. Faber, Hillsboro, OR (US); Brendan S. Traw, Portland, OR (US); Gary L. Graunke, Hillsboro, OR (US); David A. Lee, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 960 days.

(21) Appl. No.: 09/675,645

(22) Filed: Sep. 29, 2000

Related U.S. Application Data

(63) Continuation-in-part of application No. 09/385,592, filed on Aug. 29, 1999, and a continuation-in-part of application No. 09/385,590, filed on Aug. 29, 1999.

(51) Int. Cl.⁷ .......................... H04N 7/167; H04L 9/00
(52) U.S. Cl. ................... 380/200; 380/259; 713/168; 713/171
(58) Field of Search .................... 713/168–171, 713/193, 189; 380/200–203, 225–226, 221, 380/259–261, 229, 255, 37, 44

(56) References Cited

U.S. PATENT DOCUMENTS

| | | | |
|---|---|---|---|
| 3,798,360 A | 3/1974 | Feistel |
| 4,004,089 A | 1/1977 | Richard et al. |
| 4,316,055 A | 2/1982 | Feistel |
| 4,605,820 A | 8/1986 | Campbell, Jr. |
| 4,607,137 A | 8/1986 | Jansen et al. |
| 4,613,901 A | 9/1986 | Gilhousen et al. |
| 4,641,102 A | 2/1987 | Coulthart et al. |
| 4,953,208 A | 8/1990 | Ideno |
| 4,991,208 A | 2/1991 | Walker et al. |
| 5,020,106 A | 5/1991 | Rabold et al. |

(Continued)

FOREIGN PATENT DOCUMENTS

EP     0 599 366     2/1993

(Continued)

OTHER PUBLICATIONS

Schneier, Bruce; "Applied Cryptography, Second Edition, Protocols, Algorithms, and Source Code in C"; John Wiley & Sons, Inc.; Copyright 1996; Chapters 2-6 and 12-17.

(Continued)

*Primary Examiner*—Hosuk Song
(74) *Attorney, Agent, or Firm*—Michael R. Barre

(57) ABSTRACT

A video source device and a video repeater device cooperatively authenticates said video repeater apparatus to said video source device. In one embodiment, the authentication is performed using an identical authentication process a video sink device would authenticate itself to the video source device. The video repeater device augment the identical process identifying itself as a repeater device. The video repeater device also in cooperation with at least one video sink device authenticates the at least one video sink device. The video repeater device in turn, in cooperation with the video source device, authenticates the at least one video sink device to the video source device. In one embodiment, the video repeater device also in cooperation with another video repeater device, authenticates yet another at least one video sink device to the video repeater device. In like manner, the video repeater device, in cooperation with the video source device, authenticates the yet another at least one video sink device to the video source device. In one embodiment, the video repeater device includes topological information of the video sink devices among the authentication information provided to the video source device. Accordingly, video sink devices may be hierarchically organized to the video source device.

27 Claims, 4 Drawing Sheets

U.S. PATENT DOCUMENTS

| | | | |
|---|---|---|---|
| 5,195,136 A | | 3/1993 | Hardy et al. |
| 5,341,425 A | | 8/1994 | Wasilewski et al. |
| 5,341,426 A | | 8/1994 | Barney et al. |
| 5,353,353 A | * | 10/1994 | Vijeh et al. .................. 380/29 |
| 5,509,073 A | | 4/1996 | Monnin |
| 5,533,127 A | | 7/1996 | Luther |
| 5,590,194 A | | 12/1996 | Ryan |
| 5,621,799 A | | 4/1997 | Katta et al. |
| 5,657,095 A | | 8/1997 | Yoshida et al. |
| 5,673,319 A | | 9/1997 | Bellare et al. |
| 5,680,131 A | | 10/1997 | Utz |
| 5,825,879 A | | 10/1998 | Davis |
| 5,852,472 A | | 12/1998 | Prasad et al. |
| 5,862,150 A | | 1/1999 | Lavelle et al. |
| 5,940,509 A | | 8/1999 | Jovanovich et al. |
| 6,005,940 A | | 12/1999 | Kulinets |
| 6,047,103 A | * | 4/2000 | Yamauchi et al. ............ 386/94 |
| 6,061,449 A | | 5/2000 | Candelore et al. |
| 6,115,376 A | * | 9/2000 | Sherer et al. ............... 370/389 |
| 6,118,873 A | | 9/2000 | Lotspiech et al. |
| 6,167,136 A | | 12/2000 | Chou |
| 6,289,102 B1 | * | 9/2001 | Ueda et al. ................. 380/201 |
| 6,345,101 B1 | | 2/2002 | Skukla |
| 6,452,959 B1 | | 9/2002 | McDonough |
| 6,453,304 B1 | | 9/2002 | Manabu et al. |
| 6,466,669 B1 | | 10/2002 | Matsui et al. |
| 6,477,252 B1 | | 11/2002 | Faber et al. |
| 6,654,883 B1 | * | 11/2003 | Tatebayashi ............... 713/168 |
| 6,782,476 B1 | * | 8/2004 | Ishibashi ................... 713/169 |

FOREIGN PATENT DOCUMENTS

| | | |
|---|---|---|
| WO | WO 96-06504 | 2/1996 |
| WO | WO 99/19822 | 9/1998 |
| WO | WO 99/18729 | 4/1999 |
| WO | WO 01-17251 | 3/2001 |
| WO | WO 01/17252 A1 | 3/2001 |

OTHER PUBLICATIONS

Written Opinion for PCT/US00/22834; 1 page.

Written Opinion for PCT/US/00/22785; 1 page.

Heys, Howard M., An Analysis of the Statistical Self-Synchronization of Stream Ciphers, IEEE INFOCOM 2001, pp. 897-904.

Heys, Howard M., Delay Characteristics of Statistical Cipher Feedback Mode, IEEE 2001, pp. 5-9.

Simmons, Gustavus J., Symmetric and Asymmetric Encryption, Computing Surveys, vol. 11, No. 4, Dec. 1979, pp. 305-330.

The Art Of Computer Programming, vol. 2/Seminumerical Algorithms, © 1969, Addison-Wesley Publishing Company, Inc., Reading, Massachusetts; Menlo Park, California; London; Amsterdam; Don Mills, Ontario; Sydney, pp. 30-31.

High-bandwidth Digital Content Protection System, Revision 1.0, Feb. 17, 2000, pp. 1-59.

Schneier, Bruce, et al., Unbalanced Feistel Networks and Block-Cipher Design, Feb. 1996, Third International Workshop Proceedings, pp. 1-24.

Stallings, William, Cryptography and Network Security, Jun. 4, 1998, Prentice-Hall, Inc. 2nd Edition, Chapter 3.

Infocus Corporation, Digital Visual Interface (DVI) white paper, Nov. 2001, pp. 1-15.

Silicon Image, High-Bandwidth Digital Content Protection white paper, Feb. 2000, pp. 1-11.

Schneier, Bruce, Applied Cryptography, 1996, John Wiley & Sons, Inc., 2nd Edition, Chapter 1.

Search Report for PCT/US 00/22834, mailed Dec. 4, 2000, 2 pages.

Search Report for PCT/US 00/22785, mailed Dec. 6, 2000, 2 pages.

International Preliminary Examination Report PCT/US00/22834. 6 Pages. Mailed Nov. 19, 2001.

Internation Preliminary Examination Report PCT/US00/22785. 7 Pages. Mailed Nov. 5, 2001.

* cited by examiner

| Upstream Device | | Downstream Device |
|---|---|---|
| Video Source/Repeater Device ($Ak_{sv}$) | | Video Repeater/Sink Device ($Bk_{sv}$) |
| Generate $A_n$ | $\xrightarrow{A_n, Ak_{sv}}$ $\xleftarrow{Bk_{sv}, \text{Repeater}}$ | |
| Generate $K_m$ (Akey, $Bk_{sv}$) Generate $K_s$, $M_0$, $R_0$ ($K_m$, Repeater $\|$ $A_n$) | | Generate $K_m'$ (Bkey, $Ak_{sv}$) Generate $K_s'$, $M_0'$, $R_0'$ ($K_m'$, Repeater $\|$ $A_n$) |
| Determine if $R_0 = R_0'$ | $\xleftarrow{R_0'}$ | |

FIG. 3A

| Upstream Device | | Downstream Device |
|---|---|---|
| Video Source/Repeater Device | | Video Repeater Device |
| Poll Ready | $\xleftarrow{\text{Ready}}$ $\xleftarrow{\text{KSV list, V', Topology}}$ | Assemble KSV list $V'$=SHA-1(KSV list $\|$ Topology $\|$ $M_0'$) |
| V=SHA-1(KSV list $\|$ Topology $\|$ $M_0'$) Determine if V=V' | | |

FIG. 3B

METHOD AND APPARATUS FOR AUTHENTICATING AN HIERARCHY OF VIDEO RECEIVING DEVICES

RELATED APPLICATION

This application is a continuation-in-part application to U.S. patent applications Ser. Nos. 09/385,590 and 09/385,592, both entitled Digital Video Content Transmission Ciphering and Deciphering Method and Apparatus, filed on Aug. 29, 1999.

BACKGROUND OF THE INVENTION

1. Field of the Invention

The present invention relates to the field of content protection. More specifically, the present invention addresses authentication of hierarchically organized video receiving devices.

2. Background Information

In general, entertainment, education, art, and so forth (hereinafter collectively referred to as "content") packaged in digital form offer higher audio and video quality than their analog counterparts. However, content producers, especially those in the entertainment industry, are still reluctant in totally embracing the digital form. The primary reason being digital contents are particularly vulnerable to pirating. As unlike the analog form, where some amount of quality degradation generally occurs with each copying, a pirated copy of digital content is virtually as good as the "gold master". As a result, much effort have been spent by the industry in developing and adopting techniques to provide protection to the distribution and rendering of digital content.

Historically, the communication interface between a video source device (such as a personal computer) and a video sink device (such as a monitor) is an analog interface. Thus, very little focus has been given to providing protection for the transmission between the source and sink devices. With advances in integrated circuit and other related technologies, a new type of digital interface between video source and sink devices is emerging. The availability of this type of new digital interface presents yet another new challenge to protecting digital video content. While in general, there is a large body of cipher technology known, the operating characteristics such as the volume of the data, its streaming nature, the bit rate and so forth, as well as the location of intelligence, typically in the source device and not the sink device, present a unique set of challenges, requiring a new and novel solution. Parent applications Ser. Nos. 09/385,590 and 09/385,592 disclosed various protocol and cipher/deciphering techniques to authenticate a video sink device and protect transmission to the video sink device.

As technology advances, it is desired to be able to securely transmit digital video from a video source device to multiple hierarchically organized video sink devices. Thus, a need exist to authenticate devices and protect transmission in such hierarchical environment.

BRIEF DESCRIPTION OF DRAWINGS

The present invention will be described by way of exemplary embodiments, but not limitations, illustrated in the accompanying drawings in which like references denote similar elements, and in which:

FIG. 3a illustrates the process for authenticating a video repeater device to a video source device, in accordance with one embodiment (which in one embodiment, is also the same process for authenticating a downstream video repeater device to an upstream video repeater device, a video sink device to a video repeater device, as well as a video sink device to a video source device);

FIG. 3b illustrates the process for a video repeater device authenticating downstream video sink devices to an upstream video repeater device or a video source device.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
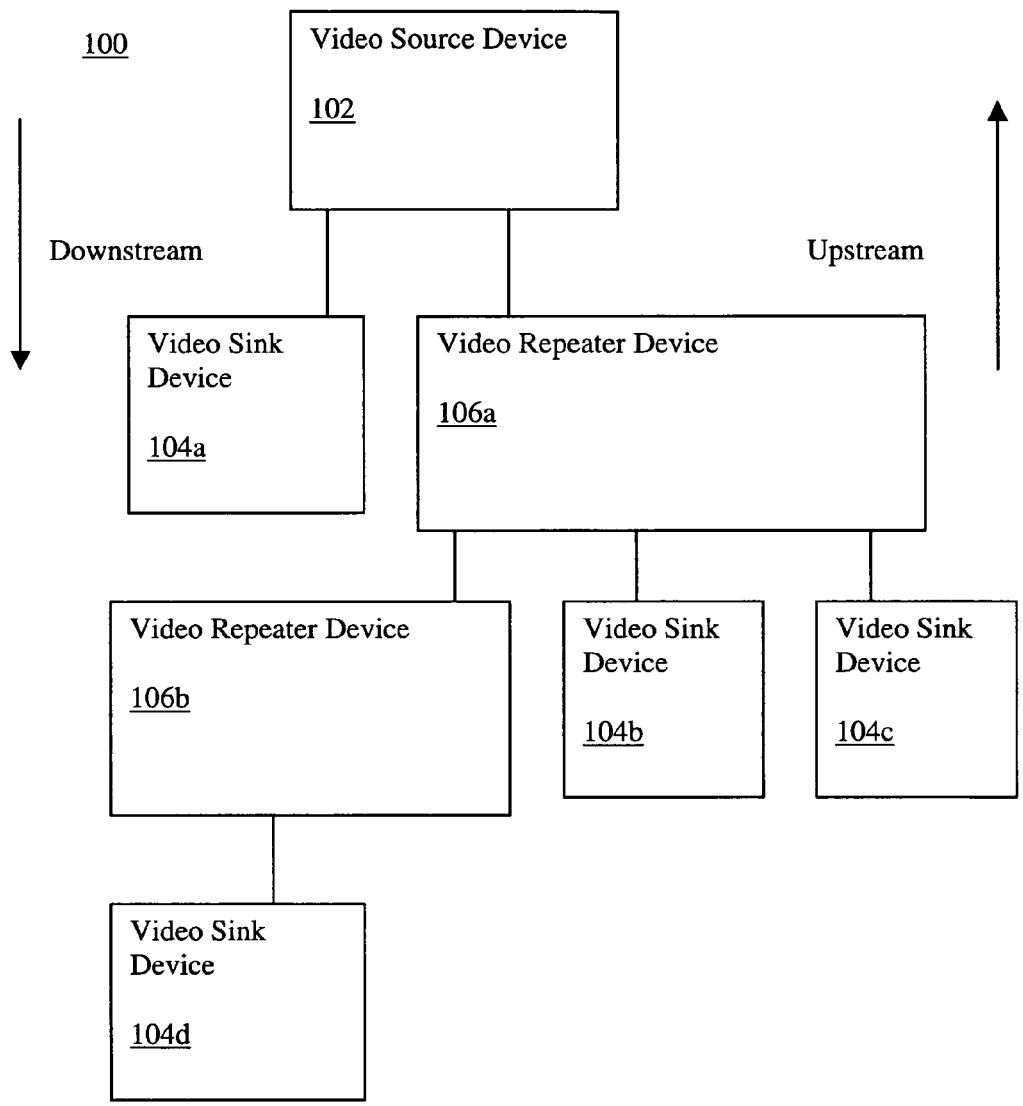
FIG. 1 illustrates an example hierarchy of video source, repeater and sink devices incorporated with the teachings of the present invention, in accordance with one embodiment.

Referring now to FIG. 1, wherein a block diagram illustrating an example hierarchy of video source, repeater and sink devices incorporated with the teachings of the present invention for authenticating the downstream video sink devices to the video source device is shown. As illustrated, example hierarchy 100 includes video source device 102, video sink devices 104a–104d, and video repeater devices 106a–106b, coupled to each other as shown. As will be described in more detail below, each video device 102, 104a–104d or 106a–106b includes an authentication unit (not shown) correspondingly incorporated with the applicable aspects of the teachings of present invention for authenticating video sink devices 104a–104d to video source device 102, to assure video source device 102 that post authentication video transmitted by video source device 102 will not be compromised by the downstream devices, such as making unauthorized copy of the video.

Except for the teachings of the present invention correspondingly incorporated therein, video source, repeater and sink devices 102, 104a–104d, and 106a–106b are intended to represent a broad range of digital devices known in the art. For examples, video source 102 may be any one of a number of digital "computing" devices known in the art, including but are not limited to, server computers, desktop computers, laptop computers, set-top boxes, DVD players and the like, and video sink devices 104a–104d may be, but are not limited to, display devices such as Cathode Ray Tubes (CRT), flat panel displays, television sets, and the like, attached to these digital "computing" devices. Alternatively, one or more video sink devices 104–104d may be another digital computing device with storage capability or a digital recording device. Video repeater devices 106a–106b may be, but are not limited to, signal repeater devices.

These devices may be coupled to one another using any one of a number of communication links known in the art. Each of inter-device communication links for conducting the authentication process may or may not be the same communication link for transmitting the post-authentication video signals. In one embodiment, the devices are communicatively coupled to each other using serial communication links known in the art. Communications may be conducted with any pre-established protocols, which are of no particular relevance to the present invention.

Before proceeding to describing the authentication process of the present invention, it should be noted that while for ease of understanding, example hierarchy 100 includes only two repeater devices and four sink devices hierarchically organized into four hierarchy levels, video source device 102, video sink device 104a and video repeater device 106a, video sink devices 104b–104c and video repeater device 106b, and video sink device 104d, from the description to follow, it will be readily apparent to those skilled in the art, that the present invention may be practiced with any number of video repeater and sink devices hierarchically organized in two or more hierarchy levels. Any number of video repeater and sink devices may be present at each level. Further, a video repeater device may also be a video sink device. Nevertheless, for ease of understanding, the remaining description will treat repeater and sink devices as separate devices.

Figure 2:
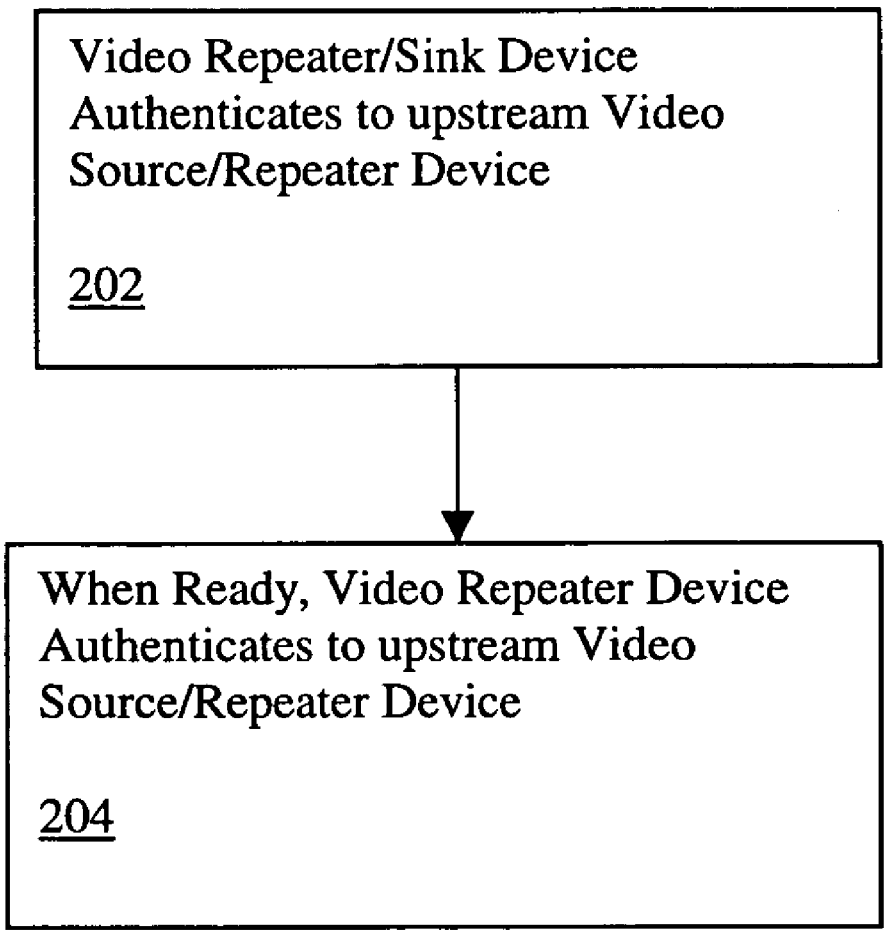
FIG. 2 illustrates an overview of the authentication method of the present invention, in accordance with one embodiment.

FIG. 2 illustrates an overview of the authentication process of the present invention, in accordance with one embodiment. As shown, upon start up, such as power on or reset, at 202, a downstream video repeater/sink device will first authenticate itself to the immediately upstream video source/repeater device. For example, in the case of example hierarchy 100 of FIG. 1, video sink device 104a and video repeater device 106a will authenticate itself to video source device 102, video repeater device 106b and video sink devices 104b–104c will authenticate itself to video repeater device 106a, and video sink device 104d will authenticate itself to video repeater device 106b.

For the illustrated embodiment, these authentications are all advantageously conducted with the same authentication process. That is, the operations performed by a pair of video source and sink devices, a pair of video source and repeater devices, a pair of video repeater devices, and a pair of video repeater and sink devices to authenticate the repeater/sink device to the source/repeater device, as the case may be, are basically the same operations. To differentiate an authenticating video repeater device, such as 106a or 106b, from a video sink device, such as 104a, 104b, or 104c, a video repeater device, such as 106a or 106b, will identify itself to the immediately upstream device, such as device 102a or 106a, that the device is a repeater device, and a video sink device, such a 104a–104d would not make such identification, thereby facilitating the participate devices to know whether the remaining authentication process, to authenticate the downstream video sink devices need to be performed or not.

At 204, an upstream device, such as source device 102 or repeater device 106a, will await the downstream device who has identified itself as a repeater device, such as device 106a and 106b, to provide the authentication information of all their downstream video sink devices, in the case of repeater device 106a, sink devices 104b–104c, and the case of repeater device 106b, sink devices 104c. When ready, that is having aggregated all authentication information of the downstream sink devices, repeater device 106a/106b would perform the remaining operations authenticating all downstream video sink devices to its immediately upstream device. As examples, in the case of example hierarchy 100 of FIG. 1, upon authenticating video sink device 104d, video repeater device 106b would authenticate video sink device 104d to immediately upstream video repeater device 106a, and for video repeater device 106a, upon first authenticating video repeater device 106b and video sink devices 104b–104c, and then authenticating video sink device 104d, video repeater device 106a would authenticate video sink devices 104b–104d to video source device 102. In each case, i.e. video repeater device 106b authenticating video sink device 104d to video repeater device 106a, and video repeater device 106a authenticating video sink devices 104b–104d to video source device 102, video repeater device 106a/106b also provides the topology information of the sink devices to video repeater/source device 106a/102. In other words, video repeater device 106b will inform video repeater device 106a that video sink device 104d is immediately downstream from it, whereas video repeater device 106a will inform video source device 102 that video sink devices 104b–104c are immediately downstream from it, and video sink device 104d is downstream from it via video repeater device 106b.

Accordingly, it can be seen, except for practical or commercial reasons, the present invention has no structural limit to the number video sink devices that can be attached to a video repeater device at each hierarchy level, nor is there any structural limit on to the number of hierarchy levels.

In one embodiment, the identical authentication process employed by the devices to authenticate itself to the immediately upstream device, as well as the authentication process employed by a repeater device to authenticate all downstream video sink devices to an immediately upstream video source/repeater device is a cooperative process that involves a symmetric ciphering/deciphering process independently performed by the authentication parties.

FIGS. 3a–3b illustrate two overviews of the symmetric ciphering/deciphering process based method for authenticating a downstream device to an immediately upstream device, and for a repeater device to authenticate all its downstream sink devices to its immediately upstream device, in accordance with one embodiment. For the illustrated embodiment, all devices correspondingly incorporated with the applicable portions of the teachings of the present invention, video source device 102, sink devices 104a–104b and repeater devices 106a–106d, are assumed to be equipped with an array of "cryptographic" device keys (Akey or Bkey) by a certification authority (hereinafter, simply device keys). In one embodiment, the assignment of these "cryptographic" device keys are performed in accordance with the teachings of the co-pending U.S. patent application Ser. No. 09/275,722, filed on Mar. 24, 1999, entitled Method and Apparatus for the Generation of Cryptographic Keys, having common assignee with the present application.

As illustrated in FIG. 3a, the authentication unit of an immediately upstream device, e.g. video source device 102, video repeater device 106a or video repeater device 106b, kicks off the authentication process with each immediately downstream device by generating a basis value ($A_n$) to the symmetric ciphering/deciphering process, and providing the basis value along with a device key selection vector ($A_n$, $Ak_{sv}$) to the immediate downstream device, e.g. video sink device 104a/video repeater devices 106a, video repeater device 106b/video sink devices 104b–104c, and video sink device 104c. [Further details on the assignment of device key selection vectors to devices may also be found in the aforementioned application Ser. No. 09/275,722.] For the example hierarchy 100 of FIG. 1, video source device 102 will kick off two authentication processes, one with video sink device 104a and another one with video repeater device 106a, video repeater device 106a will kick off three authentication processes, one with video repeater device 106b and two others, on each, with video sink device 106b, and video repeater device 106b will kick off an authentication process with video sink device 104d. For the illustrated embodiment, basis value $A_n$ is a pseudo random number. $A_n$ may be generated in any one of a number of techniques known in the art.

In response, for each of the authentication processes, the authentication unit of the immediately downstream device, e.g. video sink device 104a/video repeater device 106a, video repeat device 106b/video sink devices 104b/104c, and video sink device 104d responds by providing its device key selection vector ($Bk_{sv}$) and an indicator (Repeater) indicating whether the downstream device is a repeater device or not. In one embodiment, the Repeater indicator is a 1-bit indicator set to "1" if the downstream device is a repeater device, and set to "0" if the downstream device is not a repeater device.

Thereafter, for each of the authentication processes, each of the authentication units, of the upstream and downstream devices, will independently generate a verification value $R_0$ and $R_0'$, using the basis value $A_n$, their deviec keys, and the exchanged device key selection vectors $AK_{sv}$ and $BK_{sv}$ and the Repeater indicator. The authentication unit of the downstream device will provide its independently generated verification value $R_0'$ to the upstream device, and the authentication unit of the upstream device in turn compares the two verification values, and depending on whether the two verification values successfully compares, uses the provided $Bk_{sv}$ to determine if the downstream device is an authorized device or a device to be trusted. The upstream device accepts $Bk_{sv}$ and uses it to compare against an authorization list to determine whether the downstream device is an authorized or trustworthy device if $R_0$ equals $R_0'$, otherwise, if $R_0$ not equals $R_0'$, the downstream device is deemed to be an unauthorized or untrustworthy device. In one embodiment, subsequent video transmissions, if any, would not be passed by the upstream device to the immediately downstream device that failed the authentication process.

For the illustrated embodiment, the authentication unit of the upstream/downstream device independently generates the verification value $R_0/R_0'$ by first generating an authentication key $K_m/K_m'$. As illustrated, authentication key $K_m/K_m'$ is generated by summing device key Akey/Bkey over device key selection vector $BK_{sv}/AK_{sv}$ (see application Ser. No. 09/275,722 for detail). Next, the authentication unit of the upstream/downstream device independently generates the verification value $R_0/R_0'$ using $K_m/K_m'$, Repeater indicator, and $A_n$). In one embodiment, the authentication unit generates $R_0/R_0'$ employing a "one way function" with $K_m/K_m'$ and Repeater indicator concatenated with $A_n$.

For the illustrated embodiment, each authentication unit also generates, as part of the process for generating $R_0/R_0'$, a shared secret $M_0/M_0'$ and a session key $K_s/K_s'$. Shared secret $M_0/M_0'$ is used in the subsequent authentication of the video sink devices downstream to a video repeater device, as well as the protection of the video transmitted posted authentication. Session key $K_s/K_s'$ is used in the protection of the video transmitted posted authentication. Employment of $M_0/M_0'$ and $K_s/K_s'$ to protect the video transmitted post authentication is the subject matters of the parent applications. See the respective applications for details.

At this point, the authentication process is completed between a video source device and a video sink device, and between a video repeater device and a video sink device. For video source device and video repeater device, and for video repeater device and video repeater device, the process continues as illustrated in FIG. 3b for the immediately downstream video repeater device to authenticate to the immediately upstream video source/repeater device all downstream video sink devices.

As illustrated, for each upstream device, where the immediately downstream device has identified itself as a repeater device, it awaits for a "Ready" signal from the immediately downstream repeater device, denoting the downstream repeater device has reliably obtained the device key selection vectors of the downstream video sink devices and the downstream repeater device is ready to provide the list of device key selection vectors to the upstream device for authentication. This operation advantageously allows the device key selection vectors of the downstream video sink devices to be successively "percolated" upward through the downstream repeater devices.

Upon having reliably received all the device key selection vectors of the downstream video sink devices ($Bk_{sv}$ list), the downstream repeater device provides the reliably accumulated $Bk_{sv}$ list to its immediate upstream repeater/source device. For examples, for example hierarchy 100 of FIG. 1, video repeater device 106b, upon reliably obtaining $Bk_{sv}$ of video sink device 104d, provides the particular $Bk_{sv}$ to video repeater device 106a. For video repeater device 106a, upon authenticating $Bk_{sv}$ of video sink devices 104b–104c and upon reliably provided $Bk_{sv}$ of video sink device 104d by video repeater device 106b, it provides $Bk_{sv}$ of all downstream video sink devices, 104d as well as 104b and 104c to video source device 102.

For the illustrated embodiment, each of the downstream repeater device provides the $Bk_{sv}$ list along with a verification signature (V') and the topology information of the downstream video sink devices. For example, the topological information provided by video repeater device 106a to video source device 102 denotes to video source device 102 of the fact that video sink device 104d is actually downstream to video repeater device 106a through video repeater device 106b, however, video sink devices 104b–104c are immediately downstream to video repeater device 106a.

For the illustrated embodiment, each authentication unit of an immediately downstream video repeater device generates the verification signature V' using a predetermined hash function hashing the $Bk_{sv}$ list, the topology "vector", and the earlier described shared secret $M_0'$. In one embodiment, the $Bk_{sv}$ list, the topology "vector", and the earlier described shared secret $M_0'$ are concatenated together. The predetermined hash function may be any "secure" hashing function known in the art.

Upon receiving the $Bk_{sv}$ list, the verification signature, and the topology "vector", in like manner, the immediately upstream source/repeater device independently generates its own verification value V. In one embodiment, the immediately upstream source/repeater device independently generates its own verification value V, using the same hash function, the provided $Bk_{sv}$ list, the topology "vector", and its own independently generated shared secret $M_0$. Upon generating its own verification value V, the immediately upstream source/repeater device compares the two verification values V and V' to determine whether to accept the provided $Bk_{sv}$ list. In one embodiment, the immediately upstream source/repeater device accepts the provided $Bk_{sv}$ list (when V=V') and compares the list against an authentication list to determine whether the video sink devices are authorized or trustworthy devices, and rejects the provided $Bk_{sv}$ list if V does not equal V'. If the $Bk_{sv}$ list is rejected, the video sink devices are deemed to be unauthorized or untrustworthy sink devices. When that occurs, future video will not be provided to the immediately downstream video repeater device, thereby protecting the video from being sent to the unauthorized or untrustworthy video sink devices.

Figure 4A:
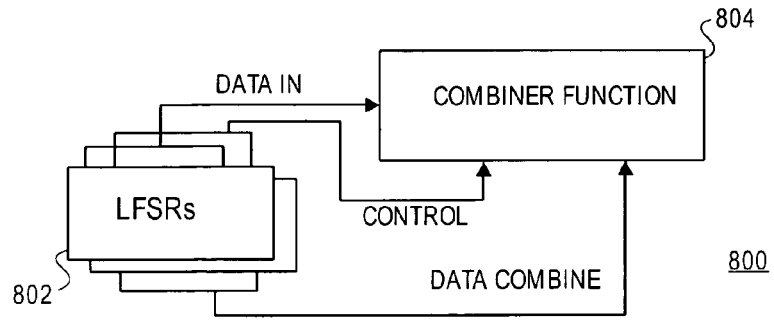
FIGS. 4a–4c illustrate a one way function suitable for use to practice the symmetric ciphering/deciphering process employed in one embodiment of the processes illustrated in FIGS. 3a–3b in further detail, in accordance with one embodiment.
Figure 4B:
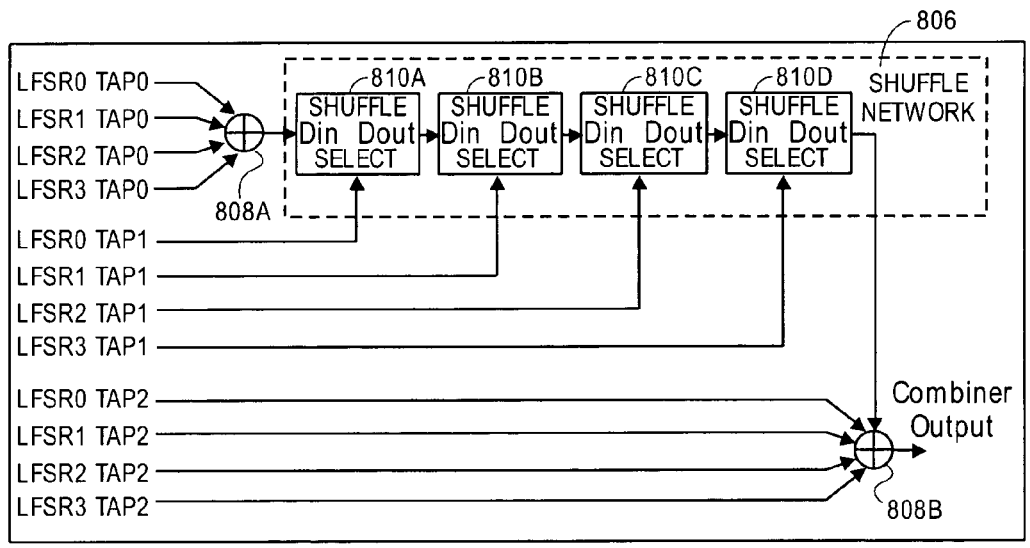
Figure 4C:
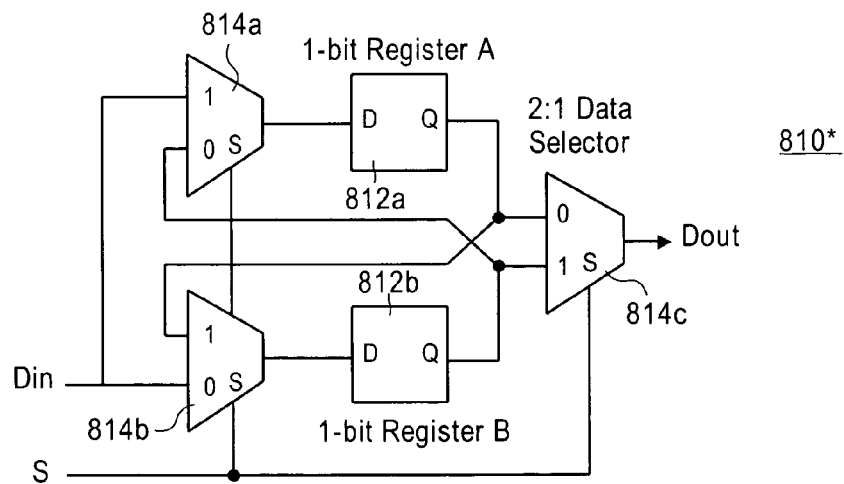

FIGS. 4a–4c illustrate a one-way function suitable for use to practice the symmetric ciphering/deciphering process of FIGS. 3a–3b, in accordance with one embodiment. As alluded to earlier, in one embodiment, this one-way function is a part of the authentication unit of each of the video source/repeater/sink devices. As illustrated in FIG. 4a, the one way function 800 includes a number of linear feedback shift registers (LFSRs) 802 and combiner function 804, coupled to each other as shown. LFSRs 802 and combiner function 804 are collectively initialized with the appropriate keys and data values. During operation, the values are successively shifted through LFSRs 802. Selective outputs are taken from LFSRs 802, and combiner function 804 is used to combine the selective outputs to generate the desired outputs.

In one embodiment, four LFSRs of different lengths are employed. Three sets of outputs are taken from the four LFSRs. The polynomials represented by the LFSR and the bit positions of the three sets of LFSR outputs are given by the table to follow:

| LFSR | Polynomial | Combining Function Taps | | |
|---|---|---|---|---|
| | | 0 | 1 | 2 |
| 3 | $X^{17} + x^{15} + x^{11} + x^5 + 1$ | 5 | 11 | 16 |
| 2 | $X^{16} + x^{15} + x^{12} + x^8 + x^7 + x^5 + 1$ | 5 | 9 | 15 |
| 1 | $X^{14} + x^{11} + x^{10} + x^7 + x^6 + x^4 + 1$ | 4 | 8 | 13 |
| 0 | $X^{13} + x^{11} + x^9 + x^5 + 1$ | 3 | 7 | 12 |

The initialization of the LFSRs and the combiner function, more spefically, the shuffling network of the combiner function, is in accordance with the following table.

| | Bit Field | Initial Value |
|---|---|---|
| LFSR3 | [16] | Complement of input bit 47 |
| | [15:0] | Input bits[55:40] |
| LFSR2 | [15] | Complement of input bit 32 |
| | [14:0] | Input bits[39:25] |
| LFSR1 | [13] | Complement of input bit 18 |
| | [12:0] | Input bits [24:12] |
| LFSR0 | [12] | Complement of input bit 6 |
| | [11:0] | Input bits[11:0] |
| Shuffle | Register A | 0 |
| Network | Register B | 1 |

The combined result is generated from the third set of LFSR outputs, using the first and second set of LFSR outputs as data and control inputs respectively to combiner function 804. The third set of LFSR outputs are combined into a single bit.

FIG. 4b illustrates combiner function 804 in further detail, in accordance with one embodiment. As illustrated, combiner function 804 includes shuffle network 806 and XOR 808a–808b, serially coupled to each other and LFSRs 802 as shown. For the illustrated embodiment, shuffle network 806 includes four binary shuffle units 810a–810d serially coupled to each other, with first and last binary shuffle units 810a and 810d coupled to XOR 808a and 808b respectively. XOR 808a takes the first group of LFSR outputs and combined them as a single bit input for shuffle network 806. Binary shuffle units 810a–810d serially propagate and shuffle the output of XOR 808a. The second group of LFSR outputs are used to control the shuffling at corresponding ones of binary shuffle units 810a–810d. XOR 808b combines the third set of LFSR outputs with the output of last binary shuffle unit 810d.

FIG. 4c illustrates one binary shuffle unit 810* (where * is one of a–d) in further detail, in accordance with one embodiment. Each binary shuffle unit 810* includes two flip-flops 812a and 812b, and a number of selectors 814a–814c, coupled to each other as shown. Flip-flops 812a and 812b are used to store two state values (A, B). Each selector 814a, 814b or 814c receives a corresponding one of the second group of LFSR outputs as its control signal. Selector 814a–814b also each receives the output of XOR 808a or an immediately preceding binary shuffle unit 810* as input. Selector 814a–814b are coupled to flip-flops 812a–812b to output one of the two stored state values and to shuffle as well as modify the stored values in accordance with the state of the select signal. More specifically, for the illustrated embodiment, if the stored state values are (A, B), and the input and select values are (D, S), binary shuffle unit 810* outputs A, and stores (B, D) if the value of S is "0". Binary shuffle unit 810* outputs B, and stores (D, A) if the value of S is "1".

Accordingly, a novel method and apparatus for authenticating hierarchically organized video repeater and sink devices has been described.

EPILOGUE

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. A method comprising:
 a video source device and a first video repeater device cooperatively authenticating the first video repeater device to the video source device;
 the first video repeater device and first at least one video sink device cooperatively authenticating the first video sink device to the first video repeater device; and
 the video source device and the first video repeater device cooperatively authenticating the first video sink device to the video source device;
 wherein said cooperative authentication of the first video sink device to the video source device comprises:
 said first video repeater device providing, to said video source device, a device key selection vector for the first video sink device.

2. The method of claim 1, wherein said cooperative authentication of the first video repeater device to the video source device comprises said video source device and said first video repeater device employing a substantially identical authentication protocol said video source device and a video sink device would employ to authenticate said video sink device to said video source device, and augmenting said substantially identical authentication protocol with identification of said first video repeater device as a repeater device to said video source device.

3. The method of claim 1, wherein said cooperative authentication of the first video repeater device to the video source device further comprises:
said video source device and said first video repeater device exchanging device key selection vectors with each other;
said first video repeater device providing said video source device with a verification key generated using a symmetric ciphering process with an authentication key generated using the received device key selection vector of said video source device; and
said video source device verifying said verification key provided by said first video repeater device.

4. The method of claim 3, wherein said cooperative authentication of the first video repeater device to the video source device further comprises said first video repeater device generating said authentication key using said received device key selection vector of said video source device and its own device key.

5. The method of claim 1, wherein:
said cooperative authentication of the first video repeater device to the video source device comprises said video source device and said first video repeater device exchanging device key selection vectors with each other; and
said method further comprises said video source device and said first video repeater device each independently generating a shared secret using a symmetric ciphering process using an authentication key generated using at least one of said device key selection vectors.

6. The method of claim 1, wherein said cooperative authentication between said first video repeater device and said video source device of the video sink device to the video source device comprises:
said first video repeater device providing a verification signature generated using the provided device key selection vector and a shared secret value between said video source device and said first video repeater device; and
said video source device verifying said verification signature.

7. The method of claim 6, wherein said method further comprises said video source device and said first video repeater device each generating said shared secret value using a symmetric ciphering process with an authentication key generated based on device key selection vectors in said video source device and said first video repeater device.

8. The method of claim 1, wherein
said method further comprises said video source device and a video sink device cooperatively authenticating said video sink device to said video source device;
both of said cooperative authentication of said first video repeater device and said video sink device to said video source device employing a substantially identical authentication protocol, with said cooperative authentication of said first video repeater device to said video source device augmenting said substantially identical authentication protocol with said first video repeater device identifying itself as a repeater device to said video source device.

9. The method of claim 1, wherein said method further comprises
said first video repeater device and a second video repeater device cooperatively authenticating second at least one video sink device to said first video repeater device; and
said video source device and said first video repeater device cooperatively authenticating said second at least one video sink device to said video source device.

10. The method of claim 9, wherein said video source device and said first video repeater device cooperatively authenticating said first and second at least one video sink device to said video source device at substantially the same time.

11. The method of claim 9, wherein said method further comprises said first video repeater conveying topological information of said first and second at least one video sink device to said video source device.

12. In a first video repeater device, a method comprising:
in cooperation with a video source device, authenticating itself to the video source device;
in cooperation with at least one video sink device, authenticating first at least one video sink device to said first video repeater device; and
in cooperation with the video source device, authenticating the first video sink device to the video source device;
wherein said authentication of the first video sink device to the video source device comprises:
said first video repeater device providing, to said video source device, a device key selection vector for the first video sink device.

13. The method of claim 12, wherein said cooperative authentication of the first video repeater device to the video source device comprises said first video repeater device employing a substantially identical authentication protocol a video sink device would employ to authenticate said video sink device to said video source device, and augmenting said substantially identical authentication protocol with identification of said first video repeater device as a repeater device to said video source device.

14. The method of claim 12, wherein said cooperative authentication of the first video repeater device to the video source device comprises:
exchanging device key selection vectors with said video source device;
identifying said first video repeater device as a repeater device to said video source device; and
providing said video source device with a verification key generated using a symmetric ciphering process with an authentication key generated using the received device key selection vector of said video source device.

15. The method of claim 14, wherein said cooperative authentication of the first video repeater device to the video source device further comprises generating said authentication key using said received device key selection vector of said video source device and its own device key.

16. The method of claim 12, wherein:
said cooperative authentication of the first video repeater device to the video source device comprises exchanging device key selection vectors with said video source device; and
said method further comprises independently generating a shared secret with said video source device using a symmetric ciphering process using an authentication key generated using at least one of said device key selection vectors.

17. The method of claim 12, wherein said cooperative authentication of the first video sink device to the video source device comprises providing a verification signature generated using the provided device key selection vector and a shared secret value with said video source device.

18. The method of claim 17, wherein said method further comprises independently generating said shared secret value using a symmetric ciphering process with an authentication key generated based on device key selection vectors of said video source device and said first video repeater device.

19. The method of claim 12, wherein said method further comprises
 a second video repeater device in cooperation with said first video repeater device authenticating second at least one video sink device to said first video repeater device; and
 in cooperation with said video source device, authenticating said second video sink device to said video source device.

20. The method of claim 19, wherein said first and second video sink devices are authenticated to said video source device at substantially the same time.

21. The method of claim 19, wherein said method further comprises conveying topological information of said first and second video sink devices to said video source device.

22. A video repeater apparatus comprising:
 first communication interface to couple first at least one video sink device to said video repeater apparatus to exchange first authentication information with the at least one video sink device;
 second communication interface to couple the video repeater apparatus to a video source device to first exchange second, then third authentication information to said video source device for first authenticating said video repeater apparatus, then said first at least one video sink device to said video source device; and
 an authentication unit coupled to said first and second communication interfaces to authenticate said first at least one video sink device, and to generate the portions of said second and third authentication information of said video repeater apparatus and said first at least one video sink device to be provided to said video source device.

23. The apparatus of claim 22, wherein
 said first, second and third authentication information exchanged comprise corresponding pair-wise combinations of device key selection vectors of said video repeater apparatus, said at least one video sink device, and said video source device, with said second and third authentication information further comprising corresponding verification keys, and said second authentication information further comprising information identifying said video repeater apparatus as a video repeater device; and
 said authentication unit comprises a ciphering unit to symmetrically generate said verification keys with corresponding authentication keys generated using the corresponding pair-wise combinations of the device key selection vectors.

24. The apparatus of claim 23, wherein said ciphering unit further independently generates corresponding shared secrets between said video repeater apparatus and said at least one video sink device, and between said video repeater apparatus and said video source device using corresponding ones of said authentication keys.

25. The apparatus of claim 24, wherein said ciphering unit further generates said verification keys using corresponding ones of said shared secrets.

26. The apparatus of claim 22, wherein
 said first communication interface is to further exchange fourth authentication information of second at least one video sink device with another video repeater apparatus;
 said third authentication information is also for authenticating said second at least one video sink device to said video source device.

27. The apparatus of claim 26, wherein said third authentication information further comprises topological information of said first and second at least one video sink device.

* * * * *